United States Patent [19]

Marcantonio

[11] Patent Number: 4,537,751

[45] Date of Patent: Aug. 27, 1985

[54] TREATMENT OF ALUMINA-BASE CATALYSTS

[75] Inventor: Paul J. Marcantonio, Novato, Calif.

[73] Assignee: Chevron Research Company, San Francisco, Calif.

[21] Appl. No.: 594,078

[22] Filed: Mar. 28, 1984

[51] Int. Cl.³ .............................................. C01F 7/02
[52] U.S. Cl. .................................. 423/114; 423/127; 423/129; 423/132
[58] Field of Search ............... 423/111, 114, 127, 132, 423/129

[56] References Cited

U.S. PATENT DOCUMENTS

| | | | |
|---|---|---|---|
| 2,224,888 | 12/1940 | Walthall | 423/111 |
| 3,183,194 | 5/1965 | Kuwata et al. | 252/317 |
| 3,216,792 | 11/1965 | Udy | 423/127 |
| 3,395,221 | 7/1968 | Snyder et al. | 424/157 |
| 3,408,159 | 10/1968 | Teichner et al. | 423/625 |
| 3,567,433 | 3/1971 | Gutnikov | 75/103 |
| 3,594,122 | 7/1971 | Miller | 423/127 |
| 4,059,418 | 11/1977 | Cull | 55/73 |
| 4,113,661 | 9/1978 | Tamm | 252/465 |
| 4,160,815 | 7/1979 | Huckabay | 423/111 |
| 4,166,787 | 9/1979 | Blanton, Jr. et al. | 208/120 |
| 4,283,380 | 8/1981 | Voirin et al. | 423/574 R |
| 4,409,190 | 10/1983 | Van Leirsburg | 423/150 |

OTHER PUBLICATIONS

"Structure and Texture of Aluminas", B. C. Lippens, doctoral thesis at *Technische Hogeschool te Delft*, 1961, pp. 28-35.

*Encylopedia of Chemical Technology*, Kirk-Othmer, article "Sulfuric Acid and Sulfur Trioxide", vol. 19, p. 461.

*Primary Examiner*—H. T. Carter
*Attorney, Agent, or Firm*—S. R. LaPaglia; W. K. Turner; V. J. Cavalieri

[57] ABSTRACT

Particulate alumina-base catalysts are treated to recycle the alumina by a two-step process: the first step involving conversion of the alumina to aluminum sulfate by reaction with gaseous sulfur trioxide, and the second step involving conversion of the aluminum sulfate to an aluminum hydroxide compound by reaction with an aqueous hydroxide. Both reactions are topochemical, and the aluminum hydroxide compound is prepared in particulate form.

12 Claims, No Drawings

TREATMENT OF ALUMINA-BASE CATALYSTS

FIELD OF THE INVENTION

This invention relates to the treatment of alumina-based catalysts, and particularly to a process for the treatment of spent particulate catalyst base to form particulate aluminum hydroxide suitable for Bayer process recovery.

BACKGROUND OF THE INVENTION

Catalysts are employed in many chemical industries to facilitate chemical reactions which would otherwise require unduly stringent reaction conditions. Many catalysts are based on alumina, used either alone (such as in Claus conversion of hydrogen sulfide, alcohol dehydration, and olefin isomerization), as a support (such as the pt/pd catalysts used in automobile exhaust systems and in gasoline reforming), and as an interactive support (particularly in hydrorefining catalysts for petroleum distillates and residual oils).

Typical hydrorefining catalysts comprise a Group VIII metal (typically nickel or cobalt) and a Group VIB metal (typically molybdenum or tungsten) supported on an alumina base. The preparation of such a catalyst may be exemplified by U.S. Pat. No. 4,113,661 to Tamm, the disclosure of which is incorporated herein by reference. The alumina present in such catalysts is typically $\gamma$-alumina, though some catalysts prepared by higher-temperature calcination contain $\delta$- or $\theta$-alumina. The catalysts are typically particulate, with sizes ranging from 0.8 mm diameter cylinders to 5–10 mm diameter cylinders, and more complex shapes such as ovals, trilobes, rings, etc. being common.

In the hydrorefining process, the catalyst typically picks up metals such as nickel and vanadium from the hydrocarbonaceous feedstock, and is frequently contaminated by iron which has made its way into the feedstock from, e.g., the walls of storage vessels, tubing, etc. as they corrode. Depending on the catalyst, hydrorefining conditions, etc., the nickel and vanadium tend to deposit throughout the catalyst by lining the pores with which it is permeated, but the iron tends to stay on the catalyst surface. These metals tend to be deposited as sulfides due to the presence of sulfur compounds in the feedstock. Hydrocarbonaceous and carbonaceous materials, such as coke, also tend to deposit in the pores, and on the surface of the catalyst. The catalyst is said to be "spent" when its catalytic ability for hydrorefining decreases below an acceptable level.

Other alumina-base catalysts are used for other processes, particularly in the petroleum industry. Cracking catalysts may to some extent be regenerated by roasting them in air to burn off deposits, since metals deposition is less significant, but eventually they become economically incapable of regeneration.

At this point, the problem of disposal of the spent catalyst arises. While the hydrocarbonaceous and carbonaceous deposits may be largely removed from the catalyst particles by roasting, oxidizing the deposits to water and carbon oxides, the metals remain. Some of the metals are sufficiently valuable to warrant recovery; others are not.

Previously, spent catalyst would simply be dumped into a landfill or similarly disposed of; but, as the price of catalytic metals has risen, it has become economically attractive to recover all or at least a portion of those metals, such as cobalt and molybdenum. U.S. Pat. Nos. 3,567,433 to Gutnikov and 4,409,190 to Van Leirsburg, the disclosures of both of which are incorporated herein by reference, exemplify processes for the recovery of metals from spent catalysts by air-roasting the catalyst followed by one or more leaching steps.

Although these processes can remove a substantial portion of the metals present, they do not remove all, and a catalyst residue is left which consists essentially of the base and a few tenths of a percent to a few percent of the catalytic or feedstock metals. From the point of view of metals recovery, it is not economic to treat this residue further, and the residue is usually disposed of in a landfill.

However, because there remain on the catalyst base some metals which are potentially capable of leaching into the environment from a landfill or dump site, the residue may be classified as a hazardous waste. In that case, disposal at a hazardous waste site at substantially greater expense may be required.

It would thus be economically desirable to be able to completely recycle the spent catalyst including the base; but the forms of alumina found in catalyst bases are typically not readily soluble in basic solutions (as, e.g., in the Bayer process), and, although they are to some extent soluble in acid solutions, this offers no particular advantage in disposal or recycling.

SUMMARY OF THE INVENTION

This invention provides a process for the treatment of spent particulate alumina-base catalysts which converts the Bayer-insoluble alumina of the catalyst to a Bayer-soluble aluminum hydroxide in particulate form, thereby facilitating the recycle of spent catalyst or catalysts residues from roasted and leached spent catalyst.

Specifically, this invention provides a process which comprises:

(a) treating the particles of catalyst with sulfur trioxide gas to cause a first reaction converting at least a substantial portion of the alumina present in the catalyst to aluminum sulfate; and (b) treating the particles produced in step (a) with an aqueous solution of the hydroxide salt of a cation having a soluble sulfate salt to cause a second reaction converting at least a substantial proportion of the aluminum sulfate to an aluminum hydroxide compound.

DETAILED DESCRIPTION OF THE INVENTION

The process of this invention is applicable to alumina-base catalysts. In this context, the term "alumina-base catalyst" means a catalyst the base (i.e., the non-catalytic support, unless the support itself is catalytic) of which comprises alumina. Generally, the term refers to a catalyst base comprising at least 50%, usually at least 80%, and preferably at least 90% by weight of alumina. The non-alumina components may be, for example, silica or other refractory oxides, aluminosilicates such as clays or zeolites, etc. While the extent of the economic applicability of the process of this invention will depend on the alumina content, with a higher alumina content being preferred, and the nature of any non-alumina content, namely whether it will interfere with the process or the intended mode of disposal of the aluminum hydroxide compound formed in the process, the process per se is expected to be applicable to any alumina-containing catalyst base. Typical catalysts suitable for the process of this invention include petroleum processing catalysts, especially hydrorefining catalysts, which become spent when contaminated by metals and hydrocarbon deposition. The process will be discussed further with particular reference to hydrorefining catalysts, but no limitation is intended by this discussion and one skilled in the art, having regard to his own knowledge and this disclosure, should have no difficulty in applying the process to other alumina-base catalysts. Such application is considered within the scope of this invention.

In the first step of the two-step process of this invention, the catalyst particles are treated with sulfur trioxide gas. This causes a topochemical reaction in which the alumina is converted to anhydrous aluminum sulfate, according to the reaction:

$$Al_2O_3(s) + 3SO_3(g) \rightarrow Al_2(SO_4)_3(s)$$

The reaction is described as topochemical because it occurs with substantially no change in the physical structure of the catalyst particles, i.e., they remain of the same shape and substantially the same size after the reaction, with no melting or powdering, etc.

If the alumina-base catalyst contains catalytic or deposited contaminant metals, it may be desirable to remove them before the process of this invention is preformed. This removal may be carried out by known methods, such as the air-roasting and leaching set forth in U.S. Pat. Nos. 3,567,433 and 4,409,190 referred to previously for petroleum processing catalysts.

Alternatively, the catalyst may be treated only by the process of this invention. In this case, the second step both converts the aluminum sulfate to an aluminum hydroxide compound and leaches the desired metals. This will be discussed further later in this specification. If the catalyst is not air-roasted or air-roasted and leached before the first step of this process, then that first step will also involve oxidation of, e.g., coke deposits to carbon oxides and water and metal sulfides to metal sulfates by the sulfur trioxide.

The sulfur trioxide required for the first step may be provided as the trioxide or, for convenience, may be prepared in situ by the reaction of sulfur dioxide and oxygen in the presence of the catalyst which is to be treated. The sulfur dioxide or trioxide may be obtained from any suitable source, such as the oxidation of the sulfur or sulfur compounds usually produced as waste in petroleum refining.

The temperature of the catalyst being treated should preferably be between 350° and 550° C., particularly between 400° and 500° C. If the temperature is too low, the reactions $$2SO_2(g) + O_2(g) \rightleftharpoons 2SO_3(g)$$

(if the SO$_3$ is being prepared in situ) and $$Al_2O_3(s) + 3SO_3(g) \rightarrow Al_2(SO_4)_3(s)$$

will occur too slowly. If the temperature is too high, the sulfur trioxide will decompose to sulfur dioxide and oxygen (since the equilibrium constant is inversely temperature-dependent) and, at much higher temperatures, the aluminum sulfate may decompose.

The reaction pressure will advantageously be atmospheric, to minimize complexities, but may be higher to take advantage of the pressure dependence of the equilibrium constant of the sulfur dioxide/sulfur trioxide reaction.

The reaction vessel may be of any suitable construction, bearing in mind the nature of the reactants and products in the first step of the process, and design of such a reaction vessel will be within the ordinary skills of one skilled in the art having regard to this disclosure. The process is economically preferably performed in a continuous fashion, but batch processing is also suitable.

In the second step of the two-step process, the particles from the first step, now comprising mostly aluminum sulfate instead of alumina and with any metals present mostly converted to sulfates, are treated with an aqueous solution of the hydroxide salt of a cation having a soluble sulfate salt. A second topochemical reaction occurs, converting the aluminum sulfate to an aluminum hydroxide compound.

The preferred aqueous solution will depend on, inter alia, the metals content of the particles produced in step (a).

If the metals content is low, so that no further recovery of metals is desired or necessary, then the aqueous solution is preferably of sodium hydroxide both for economic reasons and because the Bayer process, which is a possible disposal route for the aluminum hydroxide produced, conventionally employs sodium hydroxide, so that no contaminating cations are added. However, ammonium hydroxide, potassium hydroxide, etc. may be used if desired. The hydroxide solution in this case is preferably substantially free of carbonate and bicarbonate anions, so that only an aluminum hydroxide is formed. By "an aluminum hydroxide" is meant Al(OH)$_3$, sometimes referred to as alumina trihydrate, or AlO(OH).

The reaction pH is preferably between 9 and 12, especially between 10 and 11, to maximize the efficiency of reactions such as:

$$Al_2(SO_4)_3(s) + 6OH^-(aq.) \rightarrow 2Al(OH)_3(s^*) + 3SO_4^{2-}(aq.)$$

*non-gelatinous, easily filterable

If metals recovery from the particles is necessary or desired, then the preferred aqueous solution will be one which maximizes leaching of the metals as well as reacting with the aluminum sulfate to form an aluminum hydroxide compound. A typical preferred solution contains ammonium hydroxide and an ammonium salt such as ammonium carbonate, i.e., it is a typical leach solution for metals recovery. A typical reaction in this case may be:

$$Al_2(SO_4)_3(s) + 2NH_4^+(aq.) + 4OH^-(aq.) + 2CO_3^{2-}(aq.) \rightarrow 2NH_4Al(OH)_2CO_3.H_2O(s^*) + 3SO_4^{2-}(aq.)$$

*non-gelatinous, easily filterable

By "an aluminum hydroxide compound" is meant an aluminum hydroxide, as defined above, and other hydroxide-containing aluminum compounds such as the ammonium aluminum hydroxide carbonate described above. The reaction pH will preferably be the same as for a hydroxide-only solution.

Treatment times should be sufficient to cause substantially all of the aluminum sulfate to react to form an aluminum hydroxide compound, and determination of suitable reaction conditions will be within the ordinary skill of one skilled in the art having regard to this disclosure.

The aqueous solution, after conversion of the aluminum sulfate to an aluminum hydroxide compound, may contain some of the metals from the catalyst, the amount depending on the pH, solution composition, etc. This may be so even if the solution contains only hydroxide anions. The solution may therefore be treated by any suitable method to recover the metals therefrom.

The former catalyst particles, now containing primarily an aluminum hydroxide compound instead of alumina, may then be washed free of the aqueous solution, dried if desired, and disposed of by any suitable method. A contemplated particularly suitable method is to use them as a substitute for bauxite in the Bayer process for purifying alumina. This process, involving the dissolution of the aluminum content of the particles by concentrated alkali (usually sodium hydroxide) and subsequent reprecipitation by seeding and cooling, permits the removal of iron, silica, and titanium by their insolubility in the alkaline aluminate solution—they form a residue commonly known as "red mud". As iron, in particular, is a contemplated impurity in the bauxite, its presence in the treated catalyst particles is not a significant drawback to Bayer processing. If an aluminum hydroxide compound other than an aluminum hydroxide is formed, it may need to be converted to an aluminum hydroxide before disposal. In the case of $NH_4Al(OH)_2CO_3.H_2O$, this may be performed simply by heating to a temperature between about 150° and 300° C., preferably about 200° C., to cause the decomposition of the compound to an aluminum hydroxide.

A principal advantage of the process of this invention is that the two treatments result in topochemical reactions. In this way, the first step treatment may be carried out without the problems associated with the handling of powders or liquids and, more significantly, the second step treatment results in the formation of a particulate aluminum hydroxide compound which is easily filterable compared to the relatively intractable gels which are the usual result of aluminum hydroxide precipitation. Further, the product of the treatment is readily soluble in the Bayer process thus enabling complete recycling of the catalyst.

The invention will be further illustrated, without limitation, by the following Example.

EXAMPLE

The alumina-base catalyst selected was a petroleum refining catalyst comprising approximately 3 mm diameter $\gamma$-$Al_2O_3$-base spheres, most of which had been loaded with conventional Group VIII/Group VIB catalytic metals before use. The spent catalyst contained approximately 6% carbon as coke deposits, and also contained deposited metals from the petroleum feedstock.

100 Grams of these catalyst particles were treated by passing 333 mL/min of a 3:1 air:$SO_2$ mixture over them for 20 hours, while maintaining them at 450° C. The mixture was calculated to provide an excess of 20% of the $O_2$ necessary to oxidize the $SO_2$ to $SO_3$; and the flow rate and time calculated to provide an approximate two-fold excess of $SO_3$ over the catalyst.

An X-ray diffraction analysis of the particulate solid reaction product revealed the presence of $Al_2(SO_4)_3$. Samples of this material were treated in two different ways.

A first sample was treated with 2M $NH_4OH$ at 5% solids concentration. The pH was maintained in the range 10–11 by addition of $NH_4OH$ solution. A particulate product comprising an aluminum hydroxide was formed.

A second sample was treated with 2M $NH_4OH$/1M $(NH_4)_2CO_3$ solution, also at 5% solids concentration, for 3 hours at 90° C. A particulate product comprising an aluminum hydroxide compound was formed.

To investigate the decomposition of the aluminum hydroxide compounds formed when carbonate anions are present, particulate $Al_2(SO_4)_3.xH_2O$ was treated with the same 2M $NH_4OH$/1M $(NH_4)_2CO_3$ solution to form an aluminum hydroxide compound, presumably $NH_4Al(OH)_2CO_3.H_2O$. This compound was analyzed by thermogravimetric analysis, and a substantial weight loss observed over the temperature range 100°–300° C., presumably by the decomposition to an aluminum hydroxide.

The aluminum hydroxide product of the previous paragraph was tested for Bayer solubility by placing 5% solids in a 10% NaOH solution at room temperature, and heating the solution. Dissolution was complete at a temperature below 80° C.

What is claimed is:

1. A process for the treatment of spent particulate alumina-base catalysts, comprising:
   (a) treating the particles of catalyst with gaseous sulfur trioxide at a temperature of from 350° to 550° C. to cause a first reaction converting at least a substantial portion of the alumina present in the catalyst to aluminum sulfate; and
   (b) treating the particles produced in step (a) with an aqueous solution of the hydroxide of a cation having a soluble sulfate salt at a pH of 9 to 12 to cause a second reaction converting at least a substantial proportion of the aluminum sulfate to an aluminum hydroxide.

2. The process of claim 1 wherein the sulfur trioxide gas is prepared by the reaction of sulfur dioxide and oxygen gases in the presence of the catalyst particles in step (a).

3. The process of claim 2 wherein the reaction temperature in step (a) is between 350° and 550° C.

4. The process of claim 1 wherein the catalyst particles have been air-roasted prior to their treatment in step (a).

5. The process of claim 4 wherein the air-roasted catalyst particles have been leached of at least a portion of their catalytic metals prior to their treatment in step (a).

6. The process of claim 1 wherein the catalyst particles have not been air-roasted prior to their treatment in step (a).

7. The process of claim 1 wherein the pH of the solution is step (b) is between 10 and 11.

8. The process of claim 1 wherein the hydroxide is selected from the group consisting of sodium and ammonium hydroxides.

9. A process for the treatment of spent particulate alumina-base catalyst comprising
   (a) treating the particles of catalyst with aqueous sulfur trioxide at a temperature of from 350° to 550° C. to cause a first reaction converting at least a substantial portion of the alumina present in the catalyst to aluminum sulfate; and
   (b) treating the particles produced in step (a) with an aqueous solution of the hydroxide of a cation having a soluble sulfate salt, which aqueous solution also contains carbonate and bicarbonate ions, at a pH of 9 to 12, to cause a second reaction converting at least a substantial proportion of the aluminum sulfate to an aluminum hydroxide carbonate.

10. The process of claim 9 wherein the solution in step (b) contains ammonium hydroxide and ammonium carbonate, and the reaction product is $NH_4Al(OH)_2CO_3 \cdot H_2O$.

11. The process of claim 10 wherein the $NH_4Al(OH)_2CO_3 \cdot H_2O$ is heated to between 150° and 300° C. to cause its decomposition to an aluminum hydroxide.

12. The process of claim 11 wherein the heating temperature is about 200° C.

* * * * *

UNITED STATES PATENT AND TRADEMARK OFFICE
CERTIFICATE OF CORRECTION

PATENT NO. : 4,537,751
DATED : August 27, 1985
INVENTOR(S) : Paul J. Marcantonio It is certified that error appears in the above-identified patent and that said Letters Patent are hereby corrected as shown below:

Claim 9, Col. 6, lines 59-60, "with aqueous sulfur trioxide" should read --with gaseous sulfur trioxide--.

Signed and Sealed this

Twelfth Day of August 1986

[SEAL]

Attest:

DONALD J. QUIGG

Attesting Officer

Commissioner of Patents and Trademarks